US010886718B2

(12) United States Patent
Wells et al.

(10) Patent No.: US 10,886,718 B2
(45) Date of Patent: Jan. 5, 2021

(54) WIRELESS PUSH CAMERA

(71) Applicant: ENVIROSIGHT LLC, Randolph, NJ (US)

(72) Inventors: Jacob Wells, Portland, OR (US); Richard Lindner, Morristown, NJ (US); Wolfram Koegler, Mittelberg (AT); Michael Bühler, Durach (DE)

(73) Assignee: ENVIROSIGHT LLC, Randolph, NJ (US)

( * ) Notice: Subject to any disclaimer, the term of this patent is extended or adjusted under 35 U.S.C. 154(b) by 242 days.

(21) Appl. No.: 15/940,928

(22) Filed: Mar. 29, 2018

(65) Prior Publication Data
US 2018/0287362 A1   Oct. 4, 2018

Related U.S. Application Data

(60) Provisional application No. 62/478,392, filed on Mar. 29, 2017.

(51) Int. Cl.
*H02G 11/02* (2006.01)
*H04N 7/18* (2006.01)
*G02B 23/24* (2006.01)
*H04N 5/225* (2006.01)

(52) U.S. Cl.
CPC ......... *H02G 11/02* (2013.01); *G02B 23/2484* (2013.01); *H04N 5/2251* (2013.01); *H04N 7/183* (2013.01); *H04N 2005/2255* (2013.01)

(58) Field of Classification Search
CPC ........ H02G 11/00; H02G 11/02; H02G 15/00; H02G 15/02; H04N 5/225; H04N 5/253; H01R 39/08; G01M 3/005; G01M 3/38
See application file for complete search history.

(56) References Cited

U.S. PATENT DOCUMENTS

| 8,547,428 | B1 | 10/2013 | Olsson | |
|---|---|---|---|---|
| 2004/0232271 | A1 | 11/2004 | Alrutz et al. | |
| 2010/0089175 | A1* | 4/2010 | Swanson | B65H 61/00 73/862.44 |
| 2010/0208056 | A1 | 8/2010 | Olsson | |
| 2011/0057067 | A1* | 3/2011 | Aaland | B65H 54/72 242/390.2 |
| 2014/0013872 | A1* | 1/2014 | Thursby | G01M 3/005 73/865.8 |

(Continued)

OTHER PUBLICATIONS

International Search Report dated Jun. 11, 2018, in International Application No. PCT/US2018/025295.
(Continued)

*Primary Examiner* — Robert J McCarry, Jr.
(74) *Attorney, Agent, or Firm* — FisherBroyles LLP

(57) ABSTRACT

A push camera apparatus comprising: (a) at least one reel configured to rotate on a base to pay out or reel in a cable, the reel having a cable input; (b) the cable having a proximate end and a distal end, the proximate end being connected to the cable input; (c) a camera connected to the distal end and configured to transmit image data through the cable to the cable input; and (d) a communication module operatively connected to the cable input and configured to rotate with the reel, and to transmit wirelessly the image data from the cable input to a wireless controller.

26 Claims, 3 Drawing Sheets

(56) References Cited

U.S. PATENT DOCUMENTS

| | | | |
|---|---|---|---|
| 2014/0176696 A1* | 6/2014 | Chapman | H04N 5/2251 348/84 |
| 2014/0204197 A1 | 7/2014 | Olsson | |
| 2014/0210989 A1 | 7/2014 | Olsson | |
| 2014/0333753 A1 | 11/2014 | Chapman | |
| 2014/0340505 A1* | 11/2014 | Olsson | G01N 21/8803 348/84 |

OTHER PUBLICATIONS

Written Opinion of the International Searching Authority dated Jun. 11, 2018, in International Application No. PCT/US2018/025295.
International Preliminary Report on Patentability dated Oct. 1, 2019, in International Application No. PCT/US2018/025295.
Extended European Search Report dated Aug. 19, 2020 in European Application No. 18776873.4.

* cited by examiner

WIRELESS PUSH CAMERA

REFERENCE TO RELATED APPLICATION

This application claims priority to the Provisional Application No. 62/478,392 filed on Mar. 29, 2017, which is hereby incorporated by reference in its entirety including any appendices.

FIELD OF INVENTION

The present invention relates, generally, to a push camera, and, more specifically, to a wireless push camera in which the images and control of the camera are transmitted wirelessly to a control unit.

BACKGROUND

Push cameras are well-known and are used to inspect drain, sewer and storm pipes. A conventional push camera comprises a reel which is rotatably mounted to a stationary base via a hub located in the center of the reel. Within the reel is coiled a stiff cable having a camera mounted to its distal end. The proximate end of the cable is connected to a display/operator control panel, which is typically mounted to the base.

An electrical connection is provided between the camera and display/operator control panel such that the camera receives control signals from the operator control panel and images from the camera are displayed on the display/operator control panel. Because the reel is rotatably mounted to the stationary base, a slip ring is used to electrically connect the cable to the display/operator control panel. Additionally, often a slip ring is used within the camera such that the camera can rotate within its housing to enable the camera to self-level within the camera housing.

Using a conventional push camera is straightforward. The user inserts the camera into the pipe to be inspected, and then pushes the camera down the pipe with the cable. The reel rotates to pay out cable as the user pushes the camera down the pipe. Such push cameras offer a relatively inexpensive way to inspect drain, sewer and storm pipes.

Although this design facilitates an inexpensive inspection of a pipe, Applicant has identified a number of shortcomings with a conventional push camera. First, because the communication path between the camera and the display/operator control panel includes multiple slip rings, the signal quality along the communication path is limited. This limitation tends to restrict the imaging to standard video, which is substandard by today's standards. Generally, higher definition (HD) optical images are preferred for detecting cracks, blockage, and other pipe defects.

Second, conventional push cameras are not readily configurable with different cables. Often either longer or stiffer cables may be required for certain applications. However, a conventional push camera is essentially a unitary device with a fixed reel containing a cable. Changing a cable requires unwinding it from the reel, disconnecting it, connecting a new cable to the reel, and then reeling in the new cable. All this takes considerable time and is inconvenient, especially considering the length of some of these cables, which may be several hundred feet long. Consequently, users tend to have a different push camera for each different cable type, which not only increases costs to the user, but also tends to create clutter where space is already limited (e.g. the inside of the truck).

Third, having the display/operator control operatively mounted to the base of the push camera tends to be inconvenient. Specifically, a conventional push camera comprises a display/operator control panel hardwired to the camera and permanently affixed to the apparatus. This can make viewing the display while pushing the cable difficult. Applicant recognizes it would be more convenient for the user to use a handheld wireless device, such as a tablet, to control the push camera and view the image data.

Therefore, there is a need for a push camera that addresses the needs identified by Applicant. The present invention fulfills these needs, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention involves making the reel both electrically and mechanically discrete from the push camera unit. Rather than having the reel electrically connected to the base through a slip ring, the reel is instead connected wirelessly to the controller/display. Because the slip ring is eliminated, there is no need for a hub to accommodate the slip ring. (A hub is required to provide coincident axes between the base and the reel.) The elimination of the hub as a primary support for the reel facilitates a simpler support mechanism between the reel and the base, including a support mechanism that is releasably engageable.

Such a configuration addresses the shortcomings of a conventional push camera as discussed above. First, because the communication path between the camera and the display/operator control of the present invention reduces the number of slip rings, the signal quality along the communication path is improved, thereby facilitating higher definition (HD) optical images. Second, because the reel is releasably engageable with the base, reels having different cable configurations can be readily interchanged with a base without the need to remove the cable from the reel, which is problematic as described above. Third, because the display/operator control is wirelessly connected to the reel, a mobile display/operator control can be used, thereby facilitating flexibility and convenience in controlling the push camera system with readily available mobile devices, such as tablets, smart phones and portable computers.

Accordingly, one aspect of the invention is a push camera having a discrete reel. In one embodiment, the push camera comprises: (a) at least one reel configured to rotate on a base to payout or reel in a cable, the reel having a cable input; (b) the cable having a proximate end and a distal end, the proximate end being connected to the cable input; (c) a camera connected to the distal end and configured to transmit image data through the cable to the cable input; and (d) a communication module operatively connected to the cable input and configured to rotate with the reel, and to transmit wirelessly the image data from the cable input to a wireless controller.

Yet another aspect of the invention is a push camera that eliminates multiple slip rings along the communication path between the camera and the display/operator control. In one embodiment, the push camera comprises: (a) at least one reel configured to rotate on a base to pay out or reel in a cable, the reel having a cable input; (b) the cable having a proximate end and a distal end, the proximate end being connected to the cable input; (c) an HD camera connected to the distal end and configured to transmit HD image data along a communication path from the camera through the cable to the cable input, wherein there is no more than one slip ring along the communication path.

DETAILED DESCRIPTION

Figure 1:
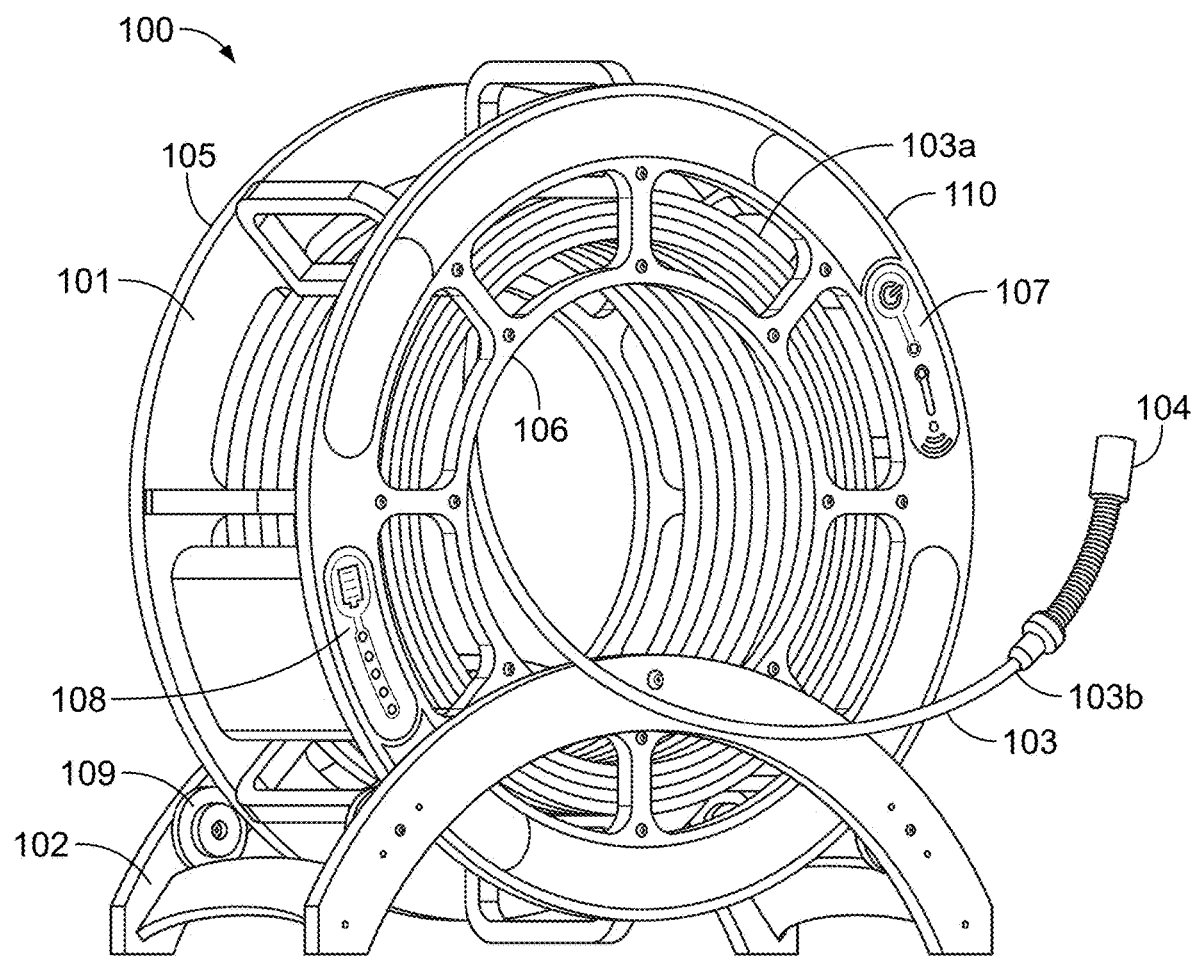
FIG. 1 is a perspective view of one embodiment of the push camera of the present invention.

Referring to FIG. 1, one embodiment of the push camera 100 of the present invention is shown. In this embodiment, the push camera 100 comprises at least one reel 101 configured to rotate on a base 102 to pay out/reel in a cable 103. The reel has a cable input 110. The cable 103 has a proximate end 103a and a distal end 103b, with the proximate end 103a being connected to the cable input 110. A camera 104 is connected to the distal end 103b, and is configured to transmit image data through the cable 103 to the cable input 110. A communication module 107 is operatively connected to the cable input 110. The communication module 107 is configured to rotate with the reel and to transmit wirelessly the image data from the cable input to a wireless controller (not shown). These features and selected alternative embodiments are described below in greater detail.

An important feature of the present invention is the wireless interface between the reel and the display/operator control. Such a configuration eliminates the need for a slip ring between the reel and the base. Accordingly, in one embodiment, the push camera of the present invention reduces the number of slip rings along the communication path between the camera and the display/operator control compared to a conventional push camera. As mentioned above, eliminating slip rings along the communication path improves the integrity of the communication path, facilitating the use of higher resolution imaging, such as, for example, HD, and ultra HD video protocols. Accordingly, in one embodiment, the camera, the cable, the cable input, and the communication module define a communication path for the image data from the camera to the wireless controller, in which there is no more than one slip ring along the communication path. In one particular embodiment, the camera comprises digital self-leveling, thereby eliminating the need for a slip ring in the camera, and thus resulting in a communication path with no slip rings. (In the prior art, often a slip ring is used within the camera such that the camera can rotate within its housing to enable the camera to self-level within the camera housing.)

As mentioned above, in one embodiment, the push camera of the present invention provides high definition (HD) images or video. As used herein, HD images or video refers to at least 720p video resolution transmitted using HD-TVI protocol over twisted-pair conductors. In one embodiment, the resolution is at least 720p, or at least 1080p, or at least 1080i, or at least 1440p video resolution transmitted using HD-TVI protocol over twisted-pair conductors. Accordingly, in one embodiment, the camera is an HD camera and image data is HD image data, and the communication module is configured for transmitting HD image data from the cable input to the wireless controller.

Eliminating the slip ring between the reel and the base not only improves the integrity of the signal from the camera as discussed above, but also eliminates the need for a hub. Hubs are required for a slip ring in prior art push cameras to provide a point where axes of the base and the reel are coincident. As mentioned above, the hub would typically involve an apparatus extending up from the base on one side of the reel, and an axle disposed in the center of the reel, connected to the apparatus. The hub/slip ring significantly complicates the installation and removal of the reel from the base. Additionally, the hub apparatus restricts access to the reel's interior, and, consequently, the cable can be payed out/reeled in only on one side of the reel. Conversely, elimination of the hub facilitates an entirely new way of securing the reel to the base. Specifically, in one embodiment, the connection between the base and the reel relies on just the periphery of the reel, which, as discussed below, facilitates the interchangeability of reels, and allows the cable to be payed out/reeled in from either side of the reel because there is no hub in the way.

Another important feature of one embodiment of the invention is the reel being releasably engageable with the base. This allows different reels having different cables to be interchangeable with the same base. In other words, one of the benefits of the push camera of the present invention is that changing cables no longer requires unreeling the cable and replacing it with a different cable, but rather each reel is associated with a particular cable, so the user simply pops out one reel and pops in a different reel having a different cable if a different cable is desired, depending on the needs of the application at hand. It is anticipated that a user may have one push camera with several reels of different cable configurations.

It should be understood that there are different mechanisms for releasably engaging the base with the reel, and these different mechanisms will be obvious to one of skill in the art in light of this disclosure. In one embodiment, the base comprises a rotation mechanism to facilitate the rotation of the reel relative to the base. For example, referring to FIGS. 1 and 3, the base comprises primary roller(s) 109, and secondary roller(s) 305. These rollers are configured to cooperate with outer and inner rails 105, 106 of the reel 101. Specifically, when the reel 101 is installed in the base 102, the outer rails 105 are supported by the primary rollers 109. In this embodiment, primary rollers 109 are configured to rotate, and therefore allow the reel to rotate without friction. To retain the reel in the base, secondary rollers 305 are configured to ride on the interior surface of the inner rails 105. Thus, the reel, when installed, is sandwiched between the primary rollers 109 and the secondary rollers 305. Although secondary rollers are illustrated herein to retain the reel in the base, other embodiments are possible. For example, as disclosed in Provisional Application No. 62/478,392, incorporated herein by reference, the base may comprise a frame that extends over the reel to hold the reel to the base.

Installation and removal of the reel in the base can be accomplish in different ways. In the embodiment illustrated in FIGS. 1-3, either one or both of the secondary rollers 305 can be moved out of the way to allow the reel to seat on the primary rollers 109. For example, in one embodiment, the secondary rollers 305 can be shifted (pushed) from the interior side of the base to the exterior side of the base to allow the reel to be removed/inserted. Alternatively, in some embodiments, it may be possible just to move one of the rollers 305 out of the way such that the reel can be tilted for installation/removal.

Although the rotation mechanism using the primary rollers 109 and secondary rollers 305 as described herein is a simple and effective way of releasably engaging the reel with the base, other mechanisms will be obvious to one of skill in the art in light of this disclosure.

Figure 2:
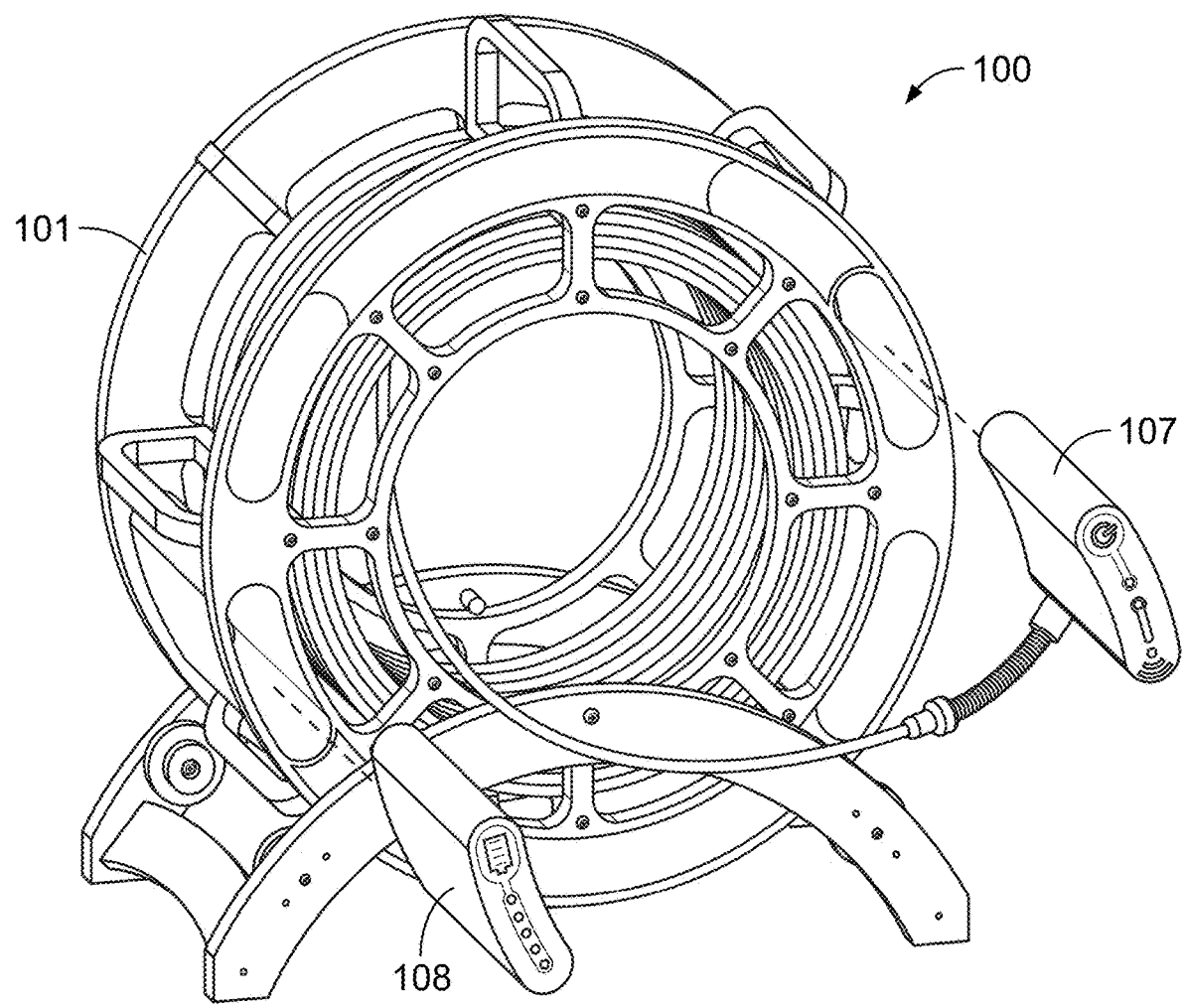
FIG. 2 is exploded view of one embodiment of the push camera of the present invention having releasable communication and power modules.
Figure 3:
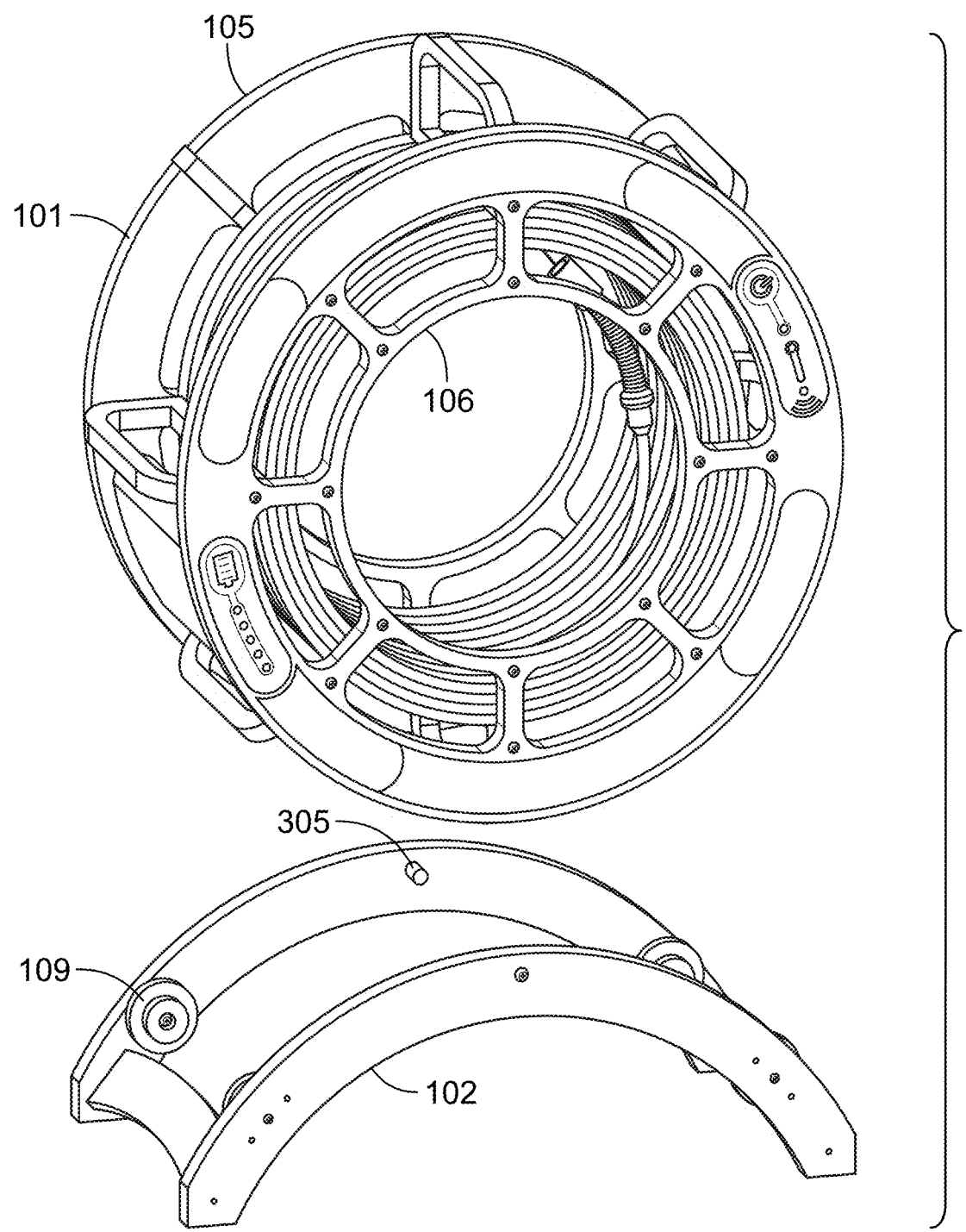
FIG. 3 is shows the embodiment of FIG. 1 with the reel separated from the base.

In one embodiment, as shown in FIGS. 1-3, the base is configured to hold the reel vertically. This is a common configuration for push cameras. However, given the fact that the push camera of the present invention does not have a hub, other configurations are possible. For example, the reel can be mounted horizontally with primary rollers configured to support one side of the reel, while secondary rollers could be configured to roll on the upward-facing side of the reel to retain it in the base. Alternatively, the need for secondary rollers may be eliminated if the reel is disposed on its side as gravity will hold it in the base. Still other embodiments and spatial configurations of the reel relative to the base will be obvious to those of skill in the art in light of this disclosure.

As mentioned above, an important aspect of the present invention is the communication module which provides a wireless link to the display/operator control, and which is configured to rotate with the reel, thereby avoiding the need for a slip ring. The configuration of the communication module may vary according to a particular application. Generally, the communication module comprises a video encoder, a Wi-Fi interface or other wireless interface, and an I/O interface for camera functions and illumination. This functionality is well known and commercially available, and thus, will not be discussed herein in detail.

In one embodiment, as shown in FIG. 2, the communication module 107 is discrete from the reel 101 and is interchangeable with other reels of the push camera system of the present invention. Such an embodiment is generally preferred as it allows just one communication module (which tends to be relatively expensive) to be used interchangeably with the different reels a user may have. In other words, each reel does not require its own communication module, just one communication module is needed for all the reels of a given push camera system. Such an approach lowers not only initial cost, but also maintenance costs—i.e., in the event a communication module fails, it can simply be popped out of the reel and replaced without disassembling the reel or otherwise taking the reel out of service.

The power supply 108 to the push camera of the present invention can vary. Generally, a power supply is needed to provide power to the communication module as well as the camera. In one embodiment, the power supply is a battery which is configured to rotate with the reel just as the communication module 107 does. Additionally, in one embodiment, like the location module 107 depicted in FIG. 2, the battery pack may be modular and discrete from the reel, allowing it to be interchanged with different reels. Having a discrete battery pack also facilitates interchanging different battery packs with the same reel, thereby allowing packs to be charged while others are in use. Battery packs are well known and commercially available, and therefore will not be described herein in detail.

Although use of the battery pack is described above and is generally preferred, other embodiments are possible. For example, in one embodiment, a battery pack is installed in the body of the reel, and it is inductively charged by the base. Such an embodiment is described, for example, in Provisional Application No. 62/478,392, incorporated herein by reference. Alternatively, although slip rings are generally not preferred along the communication path, it is within the scope of the invention that a slip ring may be used between the base and the reel to provide power to the reel. In other words, the prior art hub configuration may be used in the reel of the present invention for supplying power to the reel, while image data is transmitted wirelessly between the communication module and a wireless display/operator control. Still other embodiments of supplying power to the reel will be obvious to those of skill in the art in light of this disclosure.

In one embodiment, the present invention uses a camera positioning system to indicate the camera's position within the pipe being inspected. This is important for accurately mapping out defects or obstructions in the pipe being inspected. There are a variety of different camera positioning systems available. For example, in one embodiment, the communication module also comprises an accelerometer for rotation measurement of the reel. Because the communication module is rotating as the cable is payed out/reeled in, the communication module is able to keep track of the reel's rotation, and thereby determine the amount of cable extending from the unit. Such accelerometers are known, and consequently will not be described in detail herein. Alternatively, the camera may be configured with a geospatial distance measurement device, thereby enabling the camera to transmit a signal indicative of its position within the pipe. Again, such geospatial measurement devices are known, and consequently will not be described in detail herein. In yet another embodiment, the reel and/or base comprises sensors to detect and keep track of reel rotation within the base. For example, in one embodiment, the sensor is an encoder disposed in the reel, which records a revolution each time it passes a marker (e.g., magnet) in the base. Alternatively, in another embodiment, magnetic strips are disposed in the cable and an encoder in the base reads them as they pass by. In still another embodiment, the sensor may be a laser counter similar to a desk mouse, as described in Provisional Application No. 62/478,392, incorporated herein by reference. In another embodiment, the position system relies on RFID. Still other approaches will be obvious to those of skill in the art in light of this disclosure. It should be understood that the position-determining systems described above may be used individually, or in any combination with each other.

An important aspect of the present invention is the wireless communication between the communication module on the reel and a wireless display/operator control (i.e., a wireless controller). There are a variety of different wireless controllers that can be used with the present invention. Preferably, but not necessarily, the wireless controller is a commercially available mobile (battery-operated) wireless device such as a smart phone, tablet, or notebook/laptop computer. The wireless controller, in one embodiment, is configured not only to communicate wirelessly with the communication module, but also to interface with the Cloud to store/retrieve data.

In one embodiment, the device also comprises a trolley (not shown, see, for example, in Provisional Application No. 62/478,392, hereby incorporated by reference). The trolley may have wheels or other means to facilitate its portability. Additionally, in one embodiment the wireless control may be releasably mounted to the trolley. In one embodiment the base is detachable from the trolley. Such a mechanism allows for the convenient decoupling of the base from the trolley to allow it to be placed conveniently near the manhole or other opening through which the push camera is being inserted.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A push camera apparatus comprising:
   at least one reel configured to rotate on a base to pay out or reel in a cable;
   said cable having a proximate end and a distal end;
   a camera connected to said distal end and configured to transmit image data through said cable to said proximate end; and
   a communication module operatively connected to said proximate end and configured to rotate with said reel, and to transmit wirelessly said image data from said camera to a wireless controller.

2. The push camera apparatus of claim 1, further comprising: a power supply for delivering power to said camera.

3. The push camera apparatus of claim 2, wherein said power supply is a battery module operatively connected to said camera and said communication module and configured to rotate with said reel.

4. The push camera apparatus of claim 1, wherein said communication module comprises at least a video encoder, a Wi-Fi interface, and control I/O interface for camera functions and illumination.

5. The push camera apparatus of claim 4, wherein said communication module also comprises an accelerometer for rotation measurement of said reel in order to gauge how much cable has been deployed from the reel.

6. The push camera apparatus of claim 1, wherein said communication module is releasably engaged with said reel such that said communication module is interchangeable with other reels.

7. The push camera apparatus of claim 1, further comprises: said base.

8. The push camera apparatus of claim 7, wherein said reel is releasably engageable with said base.

9. The push camera apparatus of claim 8, wherein said reel comprises one or more outer rails and said base comprises primary rollers to cooperate with said outer reels such that said reel is rotatable on said base.

10. The push camera apparatus of claim 1, wherein said camera is an HD camera and image data is HD image data, and said communication module is configured for transmitting HD image data from said cable input to said wireless controller.

11. The push camera apparatus of claim 1, wherein said camera, said cable, said cable input, said communication module, and said wireless controller define a communication path for said image data from said camera to said wireless controller, wherein there is no more than one slip ring along said communication path.

12. The push camera apparatus of claim 11, wherein said camera comprises digital self-leveling, and wherein said communication path comprises no slip rings.

13. The push camera apparatus of claim 1, further comprising: a geospatial distance measurement device.

14. The push camera apparatus of claim 1, further comprising a second reel configured to rotate on said base to pay out or reel in a second cable, wherein said second reel is interchangeable with said reel on said base, said second reel having a cable input, and a second cable having a different length and/or different stiffness form said cable, said second cable having a proximate end and a distal end, said proximate end being connected to said cable input of said second reel.

15. The push camera apparatus of claim 14, wherein said second reel is configured for releasably engaging said communication module.

16. The push camera apparatus of claim 14, wherein said second reel is configured for releasably engaging a power module, said power module being interchangeable with said reel and said second reel.

17. A push camera comprising
   at least one reel having one or more outer rails for engaging a base to facilitate rotation of said reel on said base to payout or reel in a cable, said reel having a cable input;
   said cable having a proximate end and a distal end, said proximate end being connected to said cable input;
   an HD camera connected to said distal end and configured to transmit HD image data along a communication path from said camera through said cable to said cable input, wherein there is no more than one slip ring along said communication path.

18. The push camera apparatus of claim 17, wherein said camera comprises digital self-leveling, and wherein said communication path comprises no slip rings.

19. The push camera apparatus of claim 17, further comprising a communication module operatively connected to said cable input and configured to rotate with said reel, and to transmit wirelessly said image data from said cable input to a wireless controller.

20. The push camera apparatus of claim 17, further comprising a battery module operatively connected to said cable input and configured to rotate with said reel.

21. The push camera apparatus of claim 17, further comprising said base having primary rollers for cooperating with said outer rails to facilitate rotation of said reel on said base.

22. The push camera apparatus of claim 21, wherein said reel comprising at least one inner rail and said base comprises at least one secondary roller for engaging said inner rail to stabilize said reel on said base.

23. The push camera apparatus of claim 17, wherein said reel has no electrical connection with said base.

24. The push camera apparatus of claim 17, wherein said reel does not have a hub.

25. The push camera apparatus of claim 1, wherein said reel has no electrical connection with said base.

26. The push camera apparatus of claim 1, wherein said reel does not have a hub.

* * * * *